(12) United States Patent
Zhao et al.

(10) Patent No.: US 10,696,553 B2
(45) Date of Patent: Jun. 30, 2020

(54) METHOD OF FORMING CARBON FIBERS HAVING INTERNAL CAVITIES

(71) Applicant: Ford Global Technologies, LLC, Dearborn, MI (US)

(72) Inventors: Haibo Zhao, Northville, MI (US); Patrick James Blanchard, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 121 days.

(21) Appl. No.: 15/694,242

(22) Filed: Sep. 1, 2017

(65) Prior Publication Data

US 2017/0362088 A1 Dec. 21, 2017

Related U.S. Application Data

(62) Division of application No. 14/221,577, filed on Mar. 21, 2014, now abandoned.

(51) Int. Cl.
| | | |
|---|---|---|
| *C01B 32/05* | (2017.01) | |
| *D01D 5/42* | (2006.01) | |
| *D01F 9/12* | (2006.01) | |
| *C01B 32/16* | (2017.01) | |
| *C08K 7/06* | (2006.01) | |
| *D01D 5/24* | (2006.01) | |

(52) U.S. Cl.
CPC .............. *C01B 32/05* (2017.08); *C01B 32/16* (2017.08); *C08K 7/06* (2013.01); *D01D 5/24* (2013.01); *D01D 5/426* (2013.01); *D01F 9/12* (2013.01); *Y10T 428/2918* (2015.01)

(58) Field of Classification Search
CPC ... D01F 9/12; D01F 9/127; D01F 9/14; C01B 32/16
See application file for complete search history.

(56) References Cited

U.S. PATENT DOCUMENTS

| | | | |
|---|---|---|---|
| 3,251,729 A | 5/1966 | Shaw | |
| 4,758,259 A | 7/1988 | Jensen | |
| 4,846,864 A | 7/1989 | Huey | |
| 5,338,605 A | 8/1994 | Noland et al. | |
| 5,804,127 A * | 9/1998 | Takatori | B29C 49/24 264/515 |
| 6,844,061 B2 | 1/2005 | Morita et al. | |
| 2009/0319031 A1 * | 12/2009 | Wang | A61L 31/143 623/1.38 |
| 2013/0084455 A1 * | 4/2013 | Naskar | D01D 5/24 428/367 |
| 2014/0268535 A1 | 9/2014 | Hamburgen et al. | |

FOREIGN PATENT DOCUMENTS

CN 1394829 A 2/2003

OTHER PUBLICATIONS

Speiser, Maria, et al., Hollow Carbon Fibers With Tailored Porosity and Rim-thickness, Carbon, vol. 63, 2013, pp. 554-561.
Fuel From Chicken Feathers, Mar. 22, 2010, http://www.alternative-energy-news.info/fuel-from-chicken-feathers/, one page.

* cited by examiner

*Primary Examiner* — Francisco W Tschen
(74) *Attorney, Agent, or Firm* — Vincent Mastrogiacomo; Brooks Kushman P.C.

(57) ABSTRACT

A method of forming carbon fibers having internal cavities. The method includes applying a polymer material to a tooling component to form carbon fiber precursor hollow tubes, oxidizing the carbon fiber precursor hollow tubes, and carbonizing the carbon fiber hollow tubes to form carbon fibers, each having a hollow inner cavity.

20 Claims, 7 Drawing Sheets step 5
68 step 6 step 7 step 8
10

METHOD OF FORMING CARBON FIBERS HAVING INTERNAL CAVITIES

CROSS-REFERENCE TO RELATED APPLICATIONS

This application is a division of U.S. application Ser. No. 14/221,577 filed Mar. 21, 2014, now abandoned, which is incorporated herein by reference in its entirety.

TECHNICAL FIELD

The present disclosure relates to a method of forming carbon fibers having internal cavities.

BACKGROUND

Composite panels are commonly used to manufacture structural and body panels for vehicles and in other products. Composite panels are typically made of polymeric resins that are reinforced with carbon fibers, glass fibers, natural fibers, or the like which are dispersed in the matrix. Composite panels are typically strong, light weight and may be used in a wide variety of product applications.

SUMMARY

According to one embodiment, a method of forming carbon fibers having internal cavities is disclosed. The method includes applying a polymer material to a tooling component to form carbon fiber precursor hollow tubes, oxidizing the carbon fiber precursor hollow tubes, and carbonizing the carbon fiber hollow tubes to form carbon fibers, each having a hollow inner cavity.

According to another embodiment, a method of forming carbon fibers having internal cavities is disclosed. The method includes applying a polymer material to a tooling component having half-circle features to form carbon fiber precursor hollow tubes, oxidizing the carbon fiber precursor hollow tubes, and carbonizing the carbon fiber hollow tubes to form carbon fibers, each having a hollow inner cavity.

According to yet another embodiment, a method of forming carbon fibers having internal cavities is disclosed. The method includes applying a polymer material to a tooling component having circular inner cavities to form carbon fiber precursor hollow tubes, oxidizing the carbon fiber precursor hollow tubes, and carbonizing the carbon fiber hollow tubes to form carbon fibers, each having a hollow inner cavity.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Carbon fiber (CF) reinforced polymeric composites are gaining increasing interest in the automotive industry as a promising light weight material to meet governmental corporate average fuel economy (CAFE) requirements and to meet customer expectations for fuel economy. To meet the economical requirements of high volume production of automotive composites, low cost manufacturing processes and low cost materials are being developed.

Incorporation of carbon fiber into composite structures has been met with challenges because carbon fiber process methods are labor intensive and yield porous carbon fibers and are not suited to automotive production volumes. Such labor-intensive process methods include vacuum bag autoclaving of pre-impregnated carbon fiber composite laminates. Some attempts have been made to adapt the processing methods of composites that were developed around glass fiber reinforcements to that of carbon fiber reinforcements. These attempts have been met with challenges. The diameter of carbon fiber is typically half that of glass fiber. Accordingly, for an equivalent fiber volume loading, four times as many carbon fibers may be required to fill the same volume as compared to when using glass fiber. Particularly for random fiber composites, an increase in fiber quantity adds complexity to chopping processes due to the intimate interaction of the fibers and sizing formulation (thin layer of polymer coating) developed for carbon fibers. This fiber interaction may make the fibers clump during processing and result in inadequate dispersion of fibers. This will cause degradation in load transfer of the fibers and greatly reduce the composite mechanical properties. Hollow carbon fibers produced by a partial sulfonation process have graphene structure only near the fiber outer surface. Most of the content of the fibers produced by sulfonation are amorphous carbon, and are porous. This low crystallinity and high porosity may lead to lower strength and modulus than required for carbon reinforcing fibers.

Figure 1:
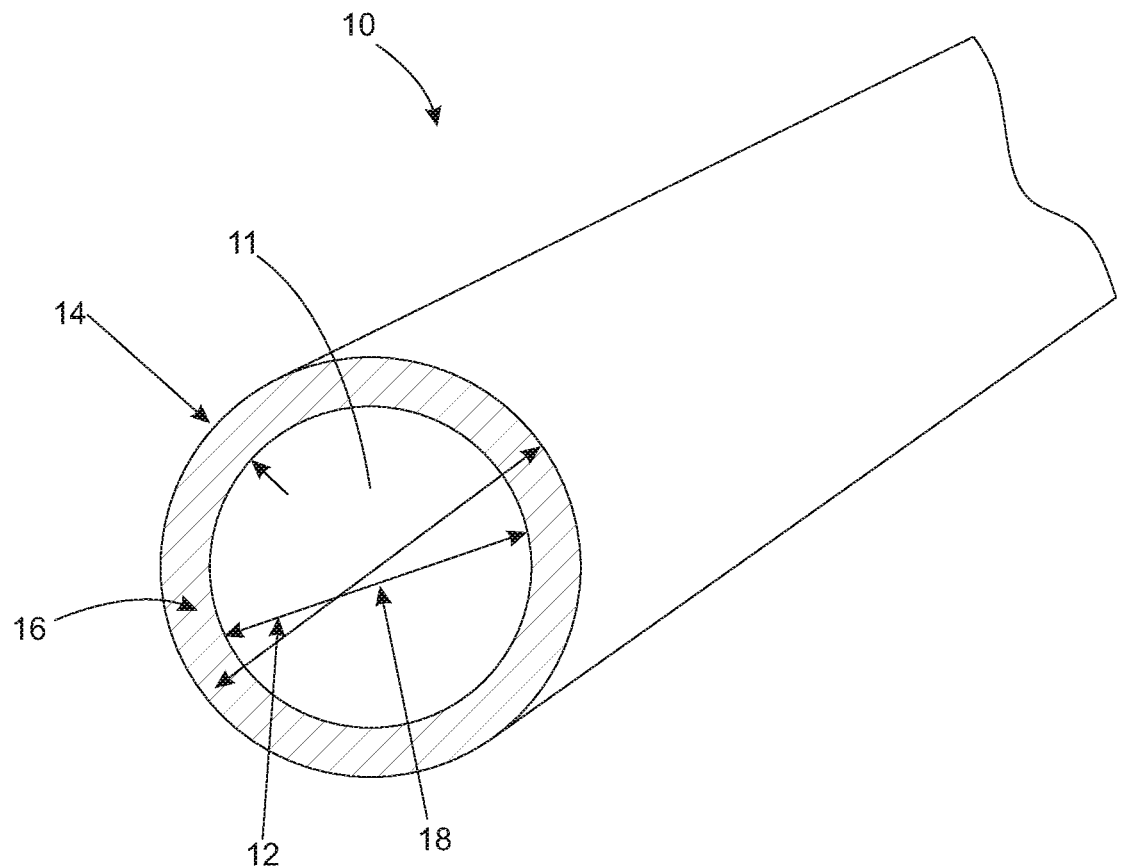
FIG. 1 is a fragmentary perspective view of a carbon fiber having an internal cavity.

Referring now to FIG. 1, the hollow carbon fiber 10 (having an internal cavity or void 11) has been formed as a cylinder tube having an outer diameter 12 and wall thickness 14 defining a cross sectional area 16. The outer diameter 12 of the fiber 10 may be from 7 μm to 30 μm, preferably from 10 to 20 μm and most preferably from 13 to 15 μm. Both the outer diameter 12 and the cross-sectional area 16 can be adjusted and may vary along the length of the tube. The cross-sectional area 16 may be from 30% to 80% of the total fiber cross sectional area. The total fiber cross sectional area is $\pi(d/2)^2$ where d is the outer diameter 12. The wall thickness 14 may be from 1 μm to 10 μm, preferably from 2 μm to 5 μm and most preferably from 2 μm to 4 μm. The outer diameter 12 of the hollow carbon fiber 10 is selected to address the issue of fiber dispersion and wet out in random fiber processing. Carbon fibers using the dimensions set forth in one or more embodiments results in a low density of fibers for reinforcement in polymeric resins. (Fibers 10, and fewer fibers required for a volume of polymeric resin, results in less interaction of the fibers and clumping.) The design having an internal cavity, sometimes referred to as a hollow core design reduces the oxidation and diffusion pathway within the polymer precursor tube thus keeping approximately the same stabilization and oxidation time as current CF manufacturing for fibers that are approximately 7 μm in diameter. One or more embodiments provide carbon fibers 10 that can be produced with a diameter similar to glass fiber. The fibers of one or more embodiments may have a diameter that is 2× or greater than standard carbon fibers. The fibers of one or more embodiments of this disclosure may have a crystalline or graphene structure and are non-porous. High crystallinity and low porosity results in good mechanical tensile strength and tensile modulus. Specific tensile strength is the tensile strength divided by density and acceleration of gravity (g).

$$\text{specific tensile strength} = \frac{\text{tensile strength}}{\text{density} \times \text{acceleration of gravity}} = \frac{\frac{\text{Newton}}{\text{Meter}^2}}{\frac{\text{Kilograms}}{\text{Meter}^3} \times \frac{\text{newton}}{\text{Kilogram}}} = \text{meter}$$

The specific tensile strength for the fibers of this disclosure may range from $5 \times 10^4$ m to $50 \times 10^4$ m, more preferably from $10 \times 10^4$ m to $40 \times 10^4$ m, and most preferably $20 \times 10^4$ m to $30 \times 10^4$ m. The specific tensile modulus is the tensile modulus divided by density and acceleration of gravity (g). The specific tensile modulus for the fibers of this disclosure may range from $5 \times 10^6$ m to $20 \times 10^6$ m, and more preferably from $10 \times 10^6$ m to $18 \times 10^6$ m, and most preferably $12 \times 10^6$ m to $15 \times 10^6$ m.

One or more embodiments provide a relatively low cost material and manufacturing process for carbon fiber reinforced materials that are crystalline and are not porous. Other embodiments of this disclosure may provide a hollow carbon fiber that is a non-cylindrical shape, for example a shape having a square or oblong cross section, or any other suitable profile.

Figure 2A:
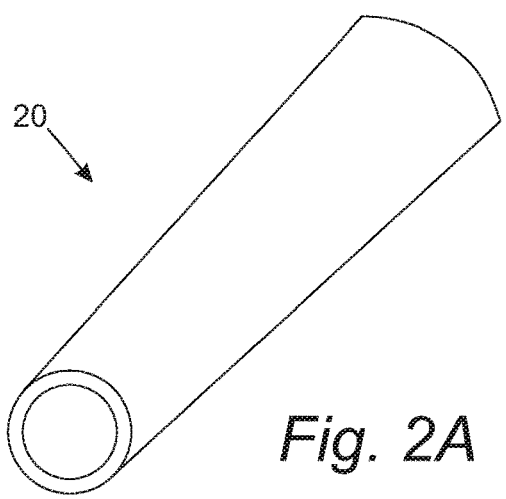
FIGS. 2A, 2B and 2C are fragmentary perspective views of a carbon fiber having an internal cavity, each view duplicating a shaping variation.
Figure 2B:
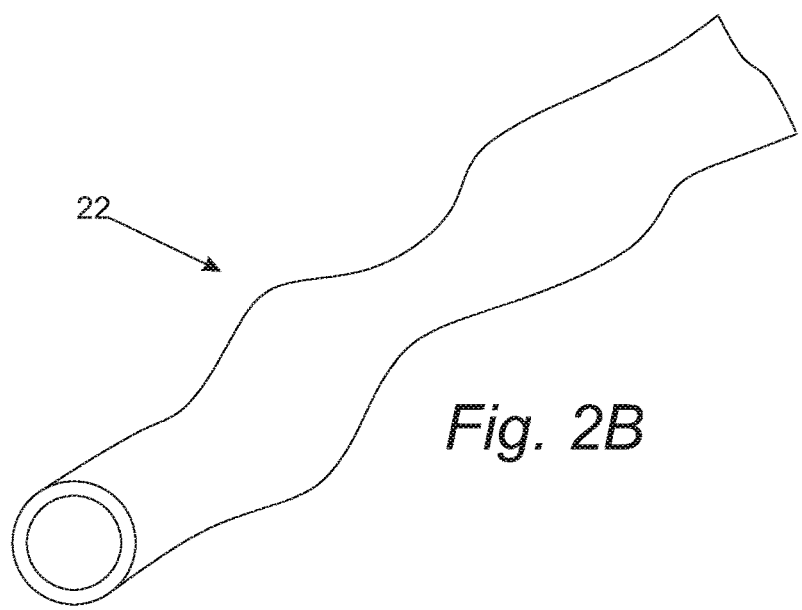
Figure 2C:
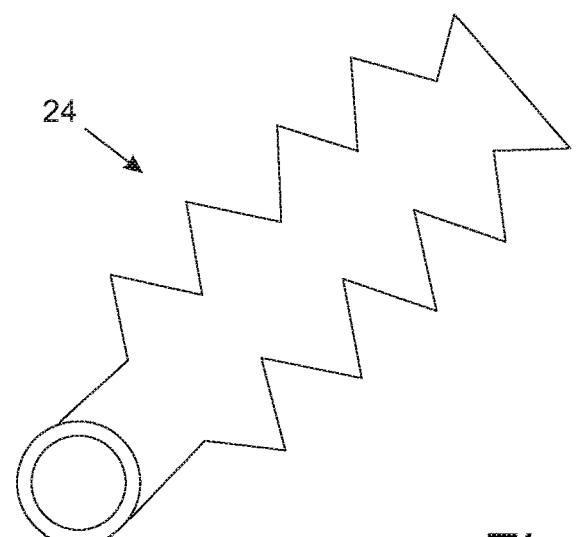

The outer and inner diameters 12 and 18 of the hollow carbon fibers 10 may vary along the length. The wall thickness 14 and cross sectional area 16 may also vary. Referring to FIG. 2A, the outer diameter 12 of the hollow carbon fiber 20 varies linearly along the length. The inner diameter 18 may also vary to maintain essentially the same cross sectional area 16 or it may remain the same, or it may vary in a manner different from the outer diameter 18. Referring to FIG. 2B, a carbon fiber tube 22 is shown where the inner diameter 18 and the outer diameter 12 vary and the cross-sectional area 16 remains the same along the length of the carbon fiber 22. Referring to FIG. 2C, a carbon fiber tube 24 is shown where the outer diameter 12 and the inner diameter 18 vary together in an accordion style.

The carbon fiber may be in a shape defining a hollow structure other than a tube or cylinder. The cross section of the hollow structure may be a square, oblong, rectangular or other shape. A first cross section taken at a first position along the length of the hollow carbon fiber and a second cross section taken at a second position along the length have cross sectional areas that are substantially the same or may vary 80%, 50%, 20%, 6% or 0.5%.

CFs are manufactured from their polymer precursors via a series of tensioning, stabilization, carbonization processing etc. The precursor shrinks over these processing by about half. One or more embodiments provides CF precursors that have the same hollow design but with all the dimensions doubled. The benefits of this design include material savings and lower fiber density. The hollow core design can save a substantial amount of material and make the fiber even lighter.

One or more embodiments involve different manufacturing methods for producing the hollow polymer precursor for the hollow carbon fiber. The embodiments may be continuous processes so as to meet the demand of high volume manufacturing for automotive and other applications. Once the polymer precursor is formed, the hollow polymer precursor is oxidized and stabilized at 200° C. to 300° C. for ~2 hours at atmospheric pressure. The polymer precursor is then carbonized at 1200° C. to 2900° C. depending on the grade of the carbon fiber. The diameter of the polymer precursor decreases during the carbonization process. The outer diameter of the polymer precursor may vary from 100 μm to 10 μm to form the hollow carbon fiber.

Figures 3A, 3B:
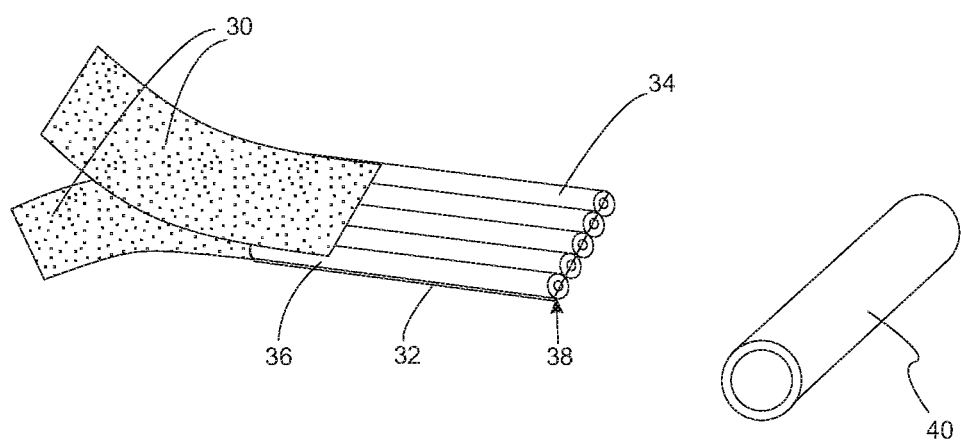
FIGS. 3A and 3B are a perspective view associated with a method for making polymer precursors for carbon fibers having internal cavities.

FIGS. 3A and 3B depict a perspective view associated with the initial step of forming polymer precursors from polymer materials in a sheet or film form. Polymer material 30 is produced in a sheet or film from CF precursor pellets. The polymer material 30 is pulled against and across one or more tooling plates 32. The tooling plates have a series of half circle features 34 extending in a longitudinal direction where the features transition to a flat shape. The film initially approaches the tool at the flat end and is tensioned and gradually formed into corrugated half-tube structures as it is pulled. The film direction may change from 10 degrees to 90 degrees from where the film touches the tool plate 36 to the end of the tool plate 38. Two half-tube films are finally hot pressed together to form complete tubes and split into individual hollow filaments. The hollow polymer precursor tubes may be collected by a spool 40.

Figure 4A:
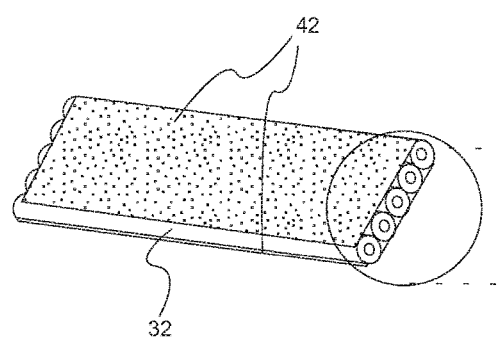
FIG. 4A is a perspective view associated with another method for making polymer precursors for carbon fibers having internal cavities.
Figure 4B:
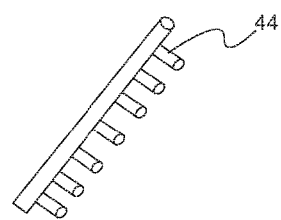
FIG. 4B is a perspective view of comb-like micro pins used in the method of making polymer precursors of FIG. 4A.
Figure 4C:
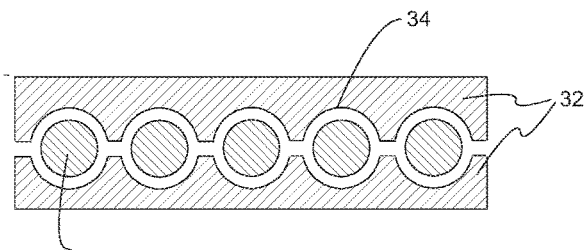
FIG. 4C is a side view of a tooling plate associated with the method of making polymer precursors for of FIG. 4A.

Referring now to FIG. 4A, a method of direct die casting of hollow tubes is provided. Polymer material 42 is heated to become re-formable and then pressed together by one or more tooling plates 32 with the half circle features 34. Comb-like micro pins 44, shown in FIG. 4B, are placed at the center of the tooling plate 32 to ensure that a hollow polymer precursor is formed. The hollow fibers are formed and may be collected by a spool. The films may be continuously pressed. The polymer material 42 and the polymer precursor may be pulled across the tooling plate 32. Referring to FIG. 4C, a cross section of the tooling plate 32 with half circle features 34 and comb-like micro pins 44 is shown.

Figure 5A:
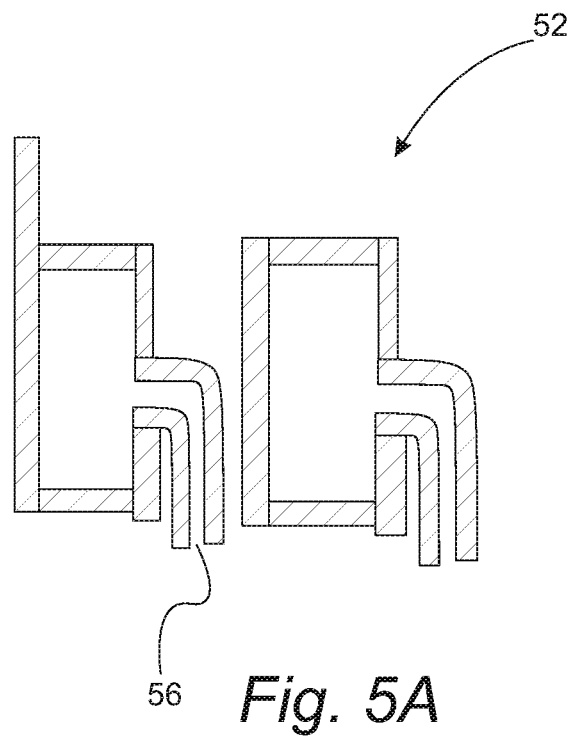
FIG. 5A is a cross section view of a gas delivery tube for a method of making polymer precursors from a liquid polymer material.
Figure 5B:
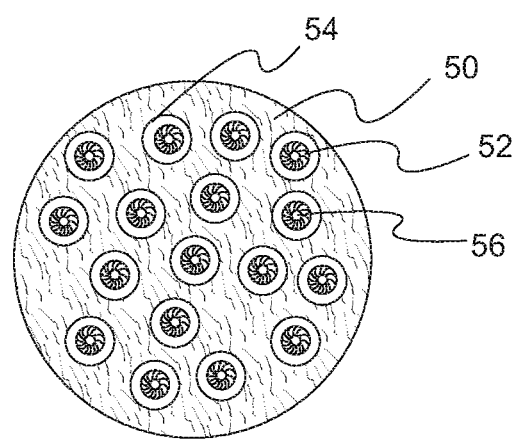
FIG. 5B is an end view of a bushing for gas delivery tubes as shown in FIG. 5A.

Referring now to FIGS. 5A and 5B, a method of making a polymer precursor is provided from a polymer material that flows and can be pumped. It may be a liquid, in a solution or as pellets. Carbon fiber materials are melted or dissolved in solutions and pumped through a bushing 50. An air, or gas, delivery tube 52 in the center of bushing holes 54 make the polymer precursors form a hollow tube structure after they are drawn out from the bushing 50 and solidified. The delivery tube prevents the hollow polymer precursor tube wall from collapse and can be a hollow tube or manifold or can be made from a porous steal rod. It can be used with or without gas flowing. It can also be a solid tube. When gas is introduced through the gas delivery tube 52, it flows out of a manifold outlet 56.

The method of forming the polymer precursor for the hollow carbon fiber may utilize mating of two sections, or partial tubes, having unequal size. A polymer precursor is formed on a tooling plate sized to produce a portion of the polymer precursor having a cross section that is more than half the cross section to be formed, with a portion that is less than half of the final cross section. The complete cross sectional shape is then formed by joining partial tubes that are not each half of the carbon fiber to be formed. The method of forming the carbon fiber may include tooling plates and bushings shaped to produce polymer precursors of different cross sectional shapes such as square or rectangular hollow fibers.

Figure 6A:
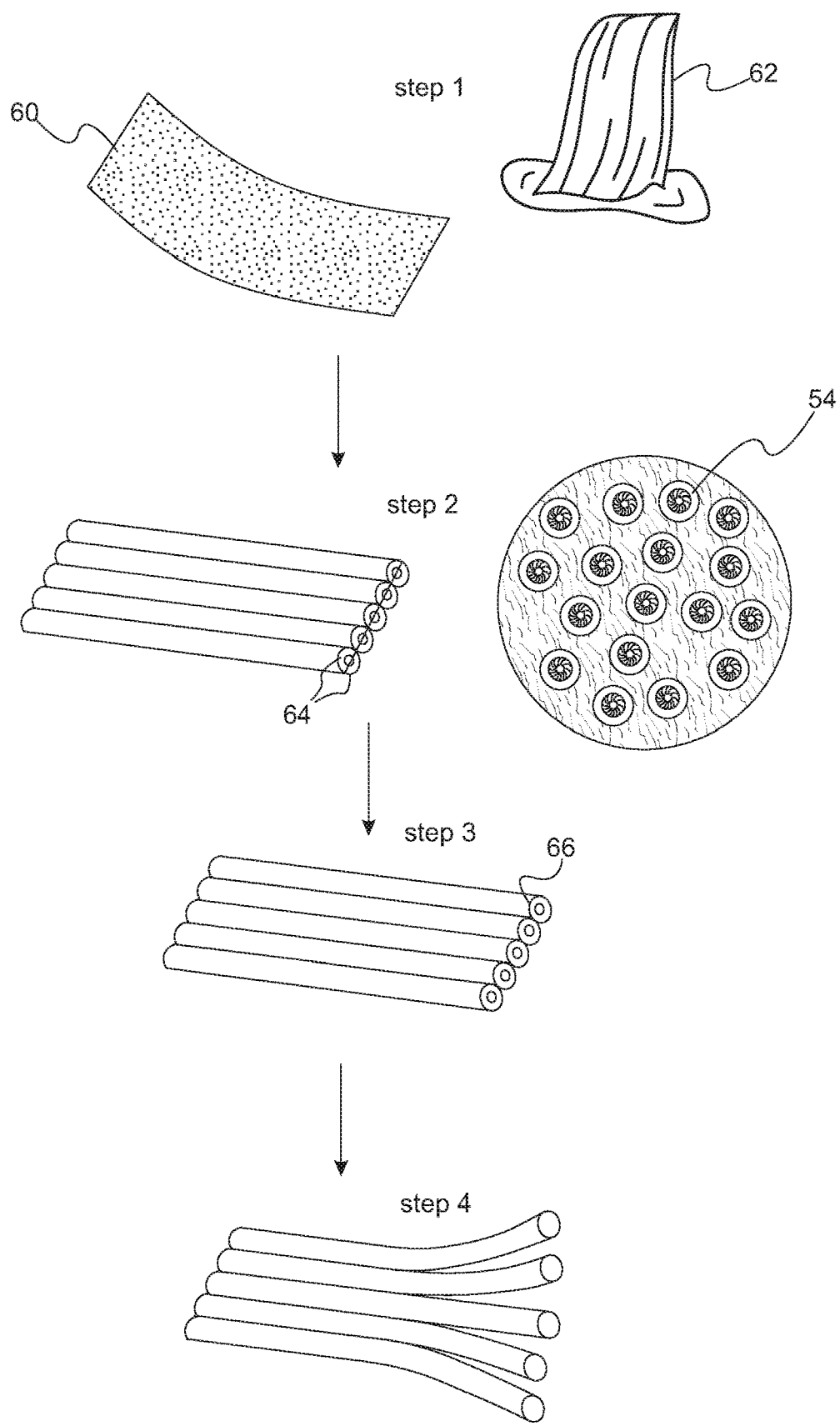
FIGS. 6A and 6B are a schematic of the steps in the method of making the carbon fibers having an internal cavity.
Figure 6B:
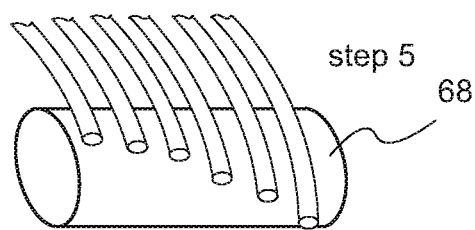
Figure 6B:
Figure 6B:
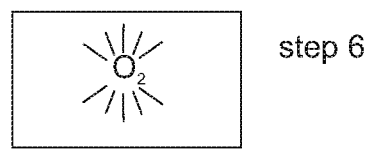
Figure 6B:
Figure 6B:
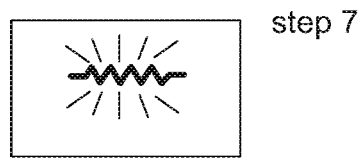
Figure 6B:
Figure 6B:
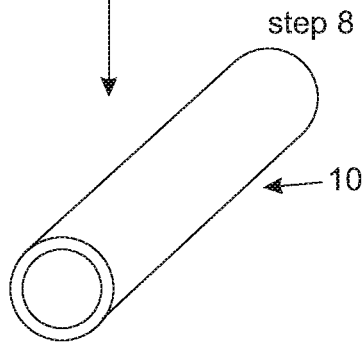

Referring now to FIGS. 6A and 6B, a flow chart of the steps in the method of making hollow carbon fibers is provided. A polymer material is provided in step 1 in the form of a sheet 60, a liquid 62, a solution or pellets. A tooling plate component is provided in step 2 with features 64 on one or both sides. The features may be half round or a portion of the final tube to be formed. The features may be flat on an end of the tooling plate and transition to the desired shape at a second end of the tooling plate. Alternatively, the tooling plate component may be shaped with holes 54 or openings to provide the features by having the polymer material provided in step 1 be a material which is a liquid 62 and flows through the openings. In step 3, portions of the polymer precursor are joined by hot pressing to form the final polymer precursor shape with walls. In step 4, shaped walls that are connected, are split into discrete polymer precursors. Step 3 and step 4 would not be required for the tooling plate component designed for a polymer material that flows. If desired, the polymer precursor can be wound onto spools in step 5. Winding on spools provides a method of transporting and feeding the polymer precursor in the next step, step 6, where the polymer precursor is oxidized and stabilized. Oxidation in step 6 may be done at atmospheric pressure and 200 to 300° C. for approximately two hours. The oxidized and stabilized polymer precursor is then carbonized in step 7 at 1,200 to 2,900° C. The required temperature depends on the quality of the polymer precursor used. Finally, in step 8 a non-porous, crystalline hollow carbon fiber 10 is formed that has a smaller diameter than the polymer precursor. The fiber diameter is reduced in steps 6 and 7 and may decrease in size by up to a factor of two.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
applying a polymer material to a tooling component to form carbon fiber precursor hollow tubes, the tooling component includes first and second plates and comb-like micropins centered between the first and second plates, each plate having a plurality of longitudinally extending half-circle features;
oxidizing the carbon fiber precursor hollow tubes; and
carbonizing the carbon fiber hollow tubes to form carbon fibers, each having a hollow inner cavity.

2. The method of claim 1, wherein the polymer material is in the form of a polymer sheet.

3. The method of claim 1, wherein the oxidizing step is carried out at a temperature of 200° C. to 300° C.

4. The method of claim 1, wherein the carbonizing step is carried out at a temperature of 1,200° C. to 1,900° C.

5. The method of claim 1, wherein the first and second plates and the comb-like micropins form a cavity therebetween.

6. The method of claim 5, wherein the applying step includes pressing the polymer material into the cavity of the tooling component to form the carbon fiber precursor hollow tubes.

7. The method of claim 6, wherein the applying step includes continuously pressing the polymer material into the cavity of the tooling component to form the carbon fiber precursor hollow tubes.

8. The method of claim 1, further comprising collecting the carbon fiber precursor hollow tubes on a spool.

9. The method of claim 1, wherein the comb-like micropins are connected through a cylindrical member.

10. A method comprising:
heating a polymeric material to obtain a heated polymeric material;
applying the heated polymer material to a tooling component to form carbon fiber precursor hollow tubes, the tooling component includes first and second plates and comb-like micropins centered between the first and second plates, each plate having a plurality of longitudinally extending half-circle features;
oxidizing the carbon fiber precursor hollow tubes; and
carbonizing the carbon fiber hollow tubes to form carbon fibers, each having a hollow inner cavity.

11. The method of claim 10, wherein the polymer material is in the form of a polymer sheet.

12. The method of claim 10, wherein the oxidizing step is carried out at a temperature of 200° C. to 300° C.

13. The method of claim 10, wherein the carbonizing step is carried out at a temperature of 1,200° C. to 1,900° C.

14. The method of claim 10, wherein the first and second plates and the comb-like micropins form a cavity therebetween.

15. The method of claim 14, wherein the applying step includes pressing the heated polymer material into the cavity of the tooling component to form the carbon fiber precursor hollow tubes.

16. The method of claim 15, wherein the applying step includes continuously pressing the heated polymer material into the cavity of the tooling component to form the carbon fiber precursor hollow tubes.

17. The method of claim 14, further comprising collecting the carbon fiber precursor hollow tubes on a spool.

18. The method of claim 10, wherein the comb-like micropins are connected through a cylindrical member.

19. A method comprising:
applying a polymer material to a tooling component having circular inner cavities to form carbon fiber precursor hollow tubes, the tooling component includes first and second plates and comb-like micropins centered between the first and second plates, each plate having a plurality of longitudinally extending half-circle features, the first and second plates and the comb-like micropins form the circular inner cavities;
oxidizing the carbon fiber precursor hollow tubes; and carbonizing the carbon fiber hollow tubes to form carbon fibers, each having a hollow inner cavity.

20. The method of claim 19, wherein the polymer material is in the form of a polymer sheet.

\* \* \* \* \*